United States Patent Office 3,642,657
Patented Feb. 15, 1972

3,642,657
PRODUCTION OF ACTIVE CARBONS FROM AROMATIC CARBOXYLIC ACIDS, PETROLEUM COKE ACID OR FROM POROUS CARBONS
Arnold N. Wennerberg, Chicago, Ill., and John T. Bukvich, Whiting, Ind., assignors to Standard Oil Company, Chicago, Ill.
No Drawing. Filed Sept. 18, 1968, Ser. No. 760,693
Int. Cl. C01b *31/08*
U.S. Cl. 252—425
9 Claims

ABSTRACT OF THE DISCLOSURE

Improved process for the production of active carbons by treating porous carbon with the oxide or hydroxide of an alkali metal or alkaline earth metal, and subjecting said treated carbon to a suitable acid anhydride and heat to form high surface carbons.

BACKGROUND OF THE INVENTION

This invention relates to activated carbons, and more particularly to an improved process for the production of such carbons.

High surface activated carbons produced by the pyrolysis of a salt of a carboxylic acid are known, and have been previously disclosed in United States patent application S.N. 706,146, filed Feb. 16, 1968, by A. N. Wennerberg and R. M. Alm. The technique described in the Wennerberg-Alm application produces a high surface area carbon with a high degree of uniformity of pore size. In United States patent application S.N. 706,145, filed Feb. 16, 1968, by A. N. Wennerberg, there is disclosed a method of activating carbons having a high degree of uniformity of pore size at relatively low temperatures. Particularly suitable carbons are those produced by the process of S.N. 706,146.

The above processes produce activated carbons of low cost and high efficiency. However, in the above-identified applications it is necessary to make use of a great deal of solvent in order to effectively solubilize the carbon precursor in order to align the structure. Because of the large amounts of solvent necessary, evaporation is generally more costly than is desired. Along with the higher cost of evaporation there is associated a penalty in activation time. Furthermore, due to the relationship between solubility and pore structure, the electrolyte, which is taught in the above-identified applications as being a defecting agent, must be carefully chosen. In addition, when water is used as the solvent, the large amounts present enhance the possibility of by-product reaction during pyrolysis. This is true since water is an excellent oxidant.

SUMMARY OF THE INVENTION

We have now discovered a process for the production of activated carbons, which process has been found to overcome the disadvantages above-mentioned. The active carbons of the present invention have been found to have considerably higher surface areas than is presently known, perhaps as high as the theoretical limit. Furthermore, such carbons may be produced at costs lower than the costs associated with the production of present carbons.

Briefly, the process of the present invention comprises treating a porous carbon with a suitable base and subsequently treating with an acid anhydride at a temperature sufficient to obtain a carbon of desired properties. The alkali metals and alkaline earth metals, in the form of the oxide or hydroxide, are suitable bases. The acid anhydride should be reactive with the base to form a reaction product which aids in expansion of the pores of the carbons and thereby increases the surface area. Dry hydrogen halides, CO, $CO_2$, etc. are satisfactory. Because of its cheapness $CO_2$ is preferred. The choice of temperature is related to the time and quantity of exposure to the acid anhydride, e.g. $CO_2$, which in turn are all determinative of the rate of increase in surface area. It is thought that the impregnation with base provides an active site for $CO_2$ reaction which allows for selective expansion of the carbon pore size. The reaction has been found to enlarge pore size and increase surface area, although it would be expected that the $CO_2$ activation of the present invention would adversely effect surface area, especially since the pore structure is not as uniform as has previously been thought necessary. The porous carbon starting material may be any known active carbon, or any suitable carbonaceous material. For example, an intermediate range porous carbon may be prepared by heat treating an aromatic acid to allow selective interaction and crosslinking to occur between individual acid molecules, thus leading to an intermediate polymer structure. This is carried out at a temperature high enough to allow for such crosslinking but sufficiently low to avoid significant decomposition of the acid. The cross-linked acid mass is then heated to decarboxylate the acid and thus form a carbon structure of intermediate range surface area. The heating procedure should be recognized as creating an aligned carbon having a relatively high surface area of essentially micropore structure. This alignment is accomplished without solubilizing the compound since it has unexpectedly been found that the above type of heat treatment provides a cross-linked structure through selective interaction. This carbon of intermediate range surface area may be used for specific applications or may be viewed as an intermediate compound which may be converted to a higher surface area carbon of larger pore range.

As may be readily observed from the above process steps, evaporation costs are held to a minimum since the impregnation of base may be accomplished with very high concentrations of base in water or other low heat capacity solvents for such base.

The process of the present invention is more specifically defined as follows, (it should be understood that the following description makes reference to $CO_2$ as the acid anhydride but the invention is not to be construed as limited thereto): Aromatic carboxylic acid is heated at a temperature of from about 200° C. to 275° C. in an inert atmosphere, e.g. $N_2$ argon, etc. for a period of from less than 1 to 4 hours, preferably about 2 hours in order for the interaction and crosslinking of the structure to occur. Coke acid, for example, derived from the oxidation of petroleum coke is preferred as the aromatic carboxylic acid.

After the molecule has been sufficiently crosslinked the temperature is then rapidly raised to 350° C. to about 500° C., preferably about 450° C. in order to induce rapid decarboxylation of the aromatic acid. Decarboxylation may be accomplished in a relatively short period of time, for example 15 minutes to 45 minutes, preferably about 30 minutes. The above heating steps may be performed in a rotating kiln or similar holding vessel. The product obtained by the above heat treatment is a carbon of intermediate surface area.

The intermediate carbon may then be treated, for example, by impregnation with base. Any suitable solvent for the treating with the base may be used; for example, water, methanol, etc. Since it is desirable to avoid as much evaporation of the solvent as possible, the base should be highly concentrated. After the impregnation the solvent may then be removed by evaporation or any other means known to the art. Any suitable vessel for impregnation and evaporation may be used in this step.

Subsequent to the evaporation of the solvent the impregnated product is activated with $CO_2$, at a temperature of from about 600° C. to 800° C., preferably about 700° C. The carbon dioxide need not be of high purity. Carbon dioxides found as components of combustion gases are entirely satisfactory. The $CO_2$ flow rate should be equated with the proportion of carbon dioxide to the total gas mixture, if such mixture is used. Less than 0.5 to 2.0 s.c.f.m. is preferred, and most preferred is 1.0 s.c.f.m. per cubic foot of kiln volume. The $CO_2$ treatment is preferably performed in the range of from less than 15 minutes to more than 1½ hours, however the most preferred time is about ½ hour. These factors may be varied considerably due to the relationship of the conditions to each other and to the end product. Again the rotating kiln is a suitable vessel, however any vessel adapted to accomplish such $CO_2$ activation may be used.

The final step is the removal of by-products formed during the previous steps. This may be accomplished by washing, with for example, water, methanol, etc. Water is, of course, preferred here.

Aromatic carboxylic acids useful in the present invention may be simple monocarboxylic acids, such as benzoic acid or polycarboxylic acids, such as terephthalic, isophthalic, trimesic, or trimellitic, polynuclear carboxylic acids, such as napthoic acid, or polynuclear polycarboxylic acid, such as coke acid. It is also contemplated that the aromatic carboxylic acids may be derived from any suitable carbonaceous material which is subsequently oxidized to form the carboxylic acid. For example, petroleum coke may be oxidized to form the coke acid. The feed material may be treated, when necessary, to remove contaminants or undesirable elements. For example, petroleum coke has a metal content, which, of course, is unsuitable for obtaining an ash-free carbon, but oxidation with nitric acid serves a dual function, i.e., forms the acid and removes metals.

Many processes are known in the art for the production of acids from corresponding carbonaceous materials. A preferred method for preparing the petroleum coke acid comprises the controlled oxidation of petroleum coke by the use of aqueous nitric acid in the concentration range of 20% to 80% by weight in water.

More specifically, suspended, finely divided coke is oxidized at atmospheric or elevated pressures in either a batch type reactor or a continuous suspension flow system. The suspended coke acid is then separated by filtration and the filtrate, aqueous nitric acid solution, may then be recycled for reuse in the oxidation. The crude coke acid produced may then be washed with water to remove any traces of nitric acid.

When carrying out the oxidation reaction at atmospheric pressure, the coke: nitric acid ratio may be in the range of from 1:2 to 1:10 by weight, preferably 1:5. The preferred concentration of the nitric acid is 30% to 50% by weight. The reaction temperature may vary from 50° C. to 125° C. It is preferred that the temperature initially be at the lower portion of this range and then be gradually increased to the upper portion of the range at the end of the reaction period. The reaction period may vary from 5 to 25 hours, depending upon the degree of agitation in the reactor, the degree of subdivision of the coke, the concentration of the aqueous nitric acid, and the rate of increase of temperature. For example, a 50 weight percent aqueous nitric acid solution, with a coke:acid ratio of 1:5 by weight which is vigorously agitated, may be heated from 60° C. to 120° C. for a 6 to 8 hour period to complete oxidation of the coke. A typical coke oxidation is shown in Example 1:

Example I

Preparation of coke acid by oxidation of petroleum coke.—400 g. of petroleum coke was suspended in 2500 ml. (2856 g.) of 55% $HNO_3$ within a 3-necked 5 l. round-bottomed flask. The flask was equipped with a stirring rod and paddle inserted through the center neck. An efficient condenser and thermowell were connected to each of the two remaining side nicks, respectively. The raw coke (about 20–40 mesh range) was stirred as a suspension while the reactor system temperature was raised from 25° C. to 112° C.–118° C. during the first 8 hours of reaction time. By-product gases from oxidation were vented out the condenser side during the course of reaction.

At the end of 8 hours reaction time, the spent aqueous $HNO_3$ solution was withdrawn from the suspension and replaced with a second charge of 2500 ml. (2856 g.) of 55% aqueous $HNO_3$. The reaction was continued for a second 8-hour period over a temperature range of 85° C. to 115° C. with most of the second reaction period at 100° C. to 118° C. At the completion of the second state of oxidation, the reaction product suspension was cooled at 25° C. and the suspended coke acid product separated from unreacted aqueous $HNO_3$ by filtration.

The crude acid reaction product was washed with cold water; five consecutive washes of 2000 ml. volume per wash. The washed, finely divided product was dried in a vacuum oven to remove last traces of water. Yield of product was 480 g. having a neutralization equivalent of 240–260 mg. KOH/g.

| Elemental analysis: | Wt. percent |
|---|---|
| C | 63.2 |
| H | 2.6 |
| O | 27.2 |
| N | 4.5 |
| S | 2.5 |

DESCRIPTION OF PREFERRED EMBODIMENTS

Example II

A charge of powdered, dry coke acid was charged to a rotating, externally heated Vycor kiln and maintained under an argon blanket. Several samples were prepared. The temperature of the first heating step, used to cross-link the structure, the holding time at such temperature, the temperature used to decarboxylate the acid and the holding time, and the B.E.T. surface area are given below:

| | First heating step | | Second heating step | | Carbon surface area, B.E.T. |
|---|---|---|---|---|---|
| | Time (hrs.) | Temp., ° C. | Time (hrs.) | Temp., ° C. | |
| Example: | | | | | |
| IIa | ¼ | 250 | 1 | 550 | 100 |
| IIb | ½ | 250 | 1 | 550 | 230 |
| IIc | ½ | 250 | ½ | 450 | 300 |
| IId | 1 | 250 | ¼ | 450 | 630 |
| IIe | 2 | 250 | ½ | 450 | 700 |

Example III

The granular active carbon of Example IIe above, was impregnated with three times its weight of 85% KOH dissolved in methanol as a 20% solution. Twenty-five grams of active carbon was suspended in solution containing 75 grams of 85% KOH dissolved in 300 grams of methanol. Methanol was evaporated from the tumbled suspension using a Rinco evaporator with the suspension heated over the range 50° C. to 200° C. at 20 mm. Hg. to effect removal of last traces of solvent. Portions of the dry impregnated carbon were charged to a rotating Vycor kiln and heated to the following specified temperatures at which time the sample was contacted with pure $CO_2$ for the specified time indicated below. $CO_2$ flow rate was 0.2 s.c.f.m. for a 400 ml. volume kiln.

|  | Charge (g.) | Time (hrs.) | Temp., °C. | Active carbon surface area, B.E.T. |
|---|---|---|---|---|
| Example: |  |  |  |  |
| IIIa | 17.6 | 2 | 600 | 851 |
| IIIb | 17.6 | ½ | 650 | 1,928 |
| IIIc | 17.6 | ½ | 700 | 2,125 |
| IIId | 17.6 | ½ | 780 | 2,650 |
| IIIe | 17.6 | ¼ | 780 | 2,557 |

All samples IIIa through IIIe were exhaustively washed with distilled water to remove all traces of basic by-product. The final wash with distilled water showed a pH of 6.5 equivalent to that of the distilled water used for washing.

Example IV

A sample was prepared as in Example IIe followed by activation with $CO_2$ under conditions specified in Example III for 1½ hours at 780° C., yielded a carbon with a surface area (B.E.T.) in excess of 2600 m.²/g. and showed a methylene blue adsorption capacity equivalent to a surface area of 2000 m.²/g.

Example V

A sample was prepared as in Example IIe by activation with $CO_2$ under conditions specified in Example III for ½ hour at 780° C., except 12 grams of impregnated carbon was charged to the kiln, and three weight units of an aqueous solution of the electrolytes listed below, for each weight unit of carbon, was used.

|  |  | Surface area | |
|---|---|---|---|
| Sample |  | B.E.T. | Methylene blue |
| Example: |  |  |  |
| Va | Carbon of Example IIe without activation. | 700 | 117 |
| Vb | Carbon of Example IIe with NaOH impregnation. | 1,880 | 1,945 |
| Vc | Carbon of Example IIe with KCl impregnation. | 450 | 109 |
| Vd | Carbon of Example IIe with $Na_2CO_3$ impregnation. | 550 | 486 |

Example VI

The powdered commercial carbons listed below were activated in accordance with Example III except 12 grams of material was charged to the kiln and activated for ¼ hour at 780° C.

|  |  | Surface area, m.²/g. | | | |
|---|---|---|---|---|---|
|  |  | Prior to activation | | After activation | |
| Commercial carbon |  | B.E.T. | Methylene blue | B.E.T. | Methylene blue |
| Example: |  |  |  |  |  |
| VIa | Darco Activated Carbon grade KB (Atlas Chemical Industries, Inc.) | 1,284 | 708 | 1,684 | 1,730 |
| VIb | Aqua Nuchar A (West Virginia Pulp and Paper Co.) | 799 | 760 | 1,302 | 1,400 |
| VIc | Activated Carbon RB Pulverized (Pittsburgh Activated Carbon Co.) | 949 | 1,096 | 1,368 | 915 |

Example VII

A sample was prepared in accordance with the procedure of Example IIId except it was not impregnated with KOH. The B.E.T. surface area was 484.

Examples I–IV clearly show that the process of the present invention may be used to obtain active carbons of extremely high surface areas. Example VI clearly shows that the process of the present invention has wide applicability to producing very high surface area carbons. Examples V and VII are included to show that the presence of base is necessary to obtain such surface areas. Apparently, the carbon of Example VII has been degraded as a result of $CO_2$ treatment without impregnation.

We claim:
1. A process for the preparation of activated carbon, comprising: (a) heating petroleum coke acid at a temperature between about 200° C. to about 275° C. in an inert atmosphere over a period of about 1 to about 4 hours, and (b) subsequently heating the petroleum coke at a temperature between about 350° C. to about 500° C. and for a time sufficient to decarboxylate the petroleum coke acid, whereby activated carbon is produced.
2. A process for the preparation of activated carbon from an aromatic carboxylic acid, comprising:
   (a) heating an aromatic carboxylic acid at a temperature sufficient to provide selective interaction and crosslinking to occur between acid molecules without decarboxylation of said acid,
   (b) heating the acid at a temperature and for a time sufficient to substantially decarboxylate the acid,
   (c) mixing the decarboxylated acid with a highly concentrated solution of a solute selected from the group consisting of alkali metal oxide, alkaline earth metal oxide, alkali metal hydroxide, and alkaline earth metal hydroxide.
   (d) heating the resultant mixture at between about 600° C. to about 800° C. in the presence of a gas selected from the group consisting of dry hydrogen halide, CO and $CO_2$, whereby easily removable contaminants are formed, and
   (e) removing the contaminants.
3. The process of claim 2 wherein prior to the decarboxylation step, the aromatic carboxylic acid is heated in step (a) at a temperature between about 200° C. to about 275° C. in an inert atmosphere over a period of about 1 to about 4 hours.
4. The process of claim 3 wherein the acid is petroleum coke acid.
5. The process of claim 3 wherein the solute is an alkali or alkaline earth hydroxide and the gas is carbon dioxide or a hydrogen halide.
6. The process of claim 5 wherein the gas is carbon dioxide.
7. The process of claim 4 wherein the solute is an alkali or alkaline earth hydroxide and the gas is carbon dioxide or a hydrogen halide.

8. The process of claim 7 wherein the gas is carbon dioxide.

9. The product of the process of claim 1.

References Cited

UNITED STATES PATENTS

| | | | |
|---|---|---|---|
| 2,640,075 | 5/1953 | Goedkoop | 260—687 |
| 2,576,020 | 11/1951 | Knops | 260—522 |
| 2,673,216 | 3/1954 | Goedkoop | 260—523 X |
| 3,035,989 | 5/1962 | Mitchell | 201—25 |
| 3,281,394 | 10/1966 | Katon | 23—209.4 X |
| 3,502,427 | 3/1970 | Johswich | 252—445 X |
| 1,813,341 | 7/1931 | Cunningham | 252—425 |
| 1,851,888 | 3/1932 | Berl | 252—425 |

FOREIGN PATENTS

| | | | |
|---|---|---|---|
| 444,260 | 5/1927 | Germany | 252—425 |
| 283,968 | 4/1924 | Great Britain | 252—425 |
| 411,918 | 6/1934 | Great Britain | 252—445 |
| 630,886 | 10/1949 | Great Britain | 252—425 |

DANIEL E. WYMAN, Primary Examiner

P. E. KONOPKA, Assistant Examiner

U.S. Cl. X.R.

23—209.2, 209.4; 201—25, 36; 252—421, 422, 445; 260—523, 587